(12) United States Patent
Moran et al.

(10) Patent No.: US 6,862,697 B1
(45) Date of Patent: Mar. 1, 2005

(54) METHOD AND SYSTEM FOR PSEUDO-RANDOM TESTING A FAULT TOLERANT NETWORK

(75) Inventors: John M. Moran, Mebane, NC (US); Eric R. Vook, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 559 days.

(21) Appl. No.: 09/969,079

(22) Filed: Sep. 28, 2001

(51) Int. Cl.[7] .............................................. G06F 11/22
(52) U.S. Cl. ............................. 714/43; 714/4; 714/728
(58) Field of Search ............................. 714/4, 43, 728

(56) References Cited

U.S. PATENT DOCUMENTS

| | | | | |
|---|---|---|---|---|
| 5,862,362 A | * | 1/1999 | Somasegar et al. ........... 703/21 |
| 6,314,531 B1 | * | 11/2001 | Kram ........................... 714/38 |
| 2002/0091969 A1 | * | 7/2002 | Chen et al. .................... 714/43 |

* cited by examiner

Primary Examiner—Robert Beausoliel
Assistant Examiner—Joseph D Manoskey
(74) Attorney, Agent, or Firm—A. Jose Cortina; Daniels Daniels & Verdonik, P.A.; R. Kevin Perkins

(57) ABSTRACT

A method and system for pseudo-random testing a fault tolerant network for determining the network's response to failure includes generating an image of the network on a host. At least one path of the network is selected to be physically failed through the use of a random number generator such that the selection is done pseudo-randomly. The part is then failed and the network's response to the failure is detected and all attempts to repair the failure logged up to and including the first successful attempt to repair the failure. In the event of a failure to repair a path occurs, the test is stopped, a repair effected, and the test restarted at the point the failure to repair occurred.

17 Claims, 4 Drawing Sheets

METHOD AND SYSTEM FOR PSEUDO-RANDOM TESTING A FAULT TOLERANT NETWORK

BACKGROUND OF THE INVENTION

1. Field of the Invention

There is disclosed herein a method and system for pseudo-random testing a fault tolerant network to determine the network's response to a failure. More specifically, the method and system discussed herein includes the ability for restarting a pseudo-random sequence in the middle of a sequence.

2. Description of the Background

Pseudo-random testing sequences are used extensively in testing computer software and hardware. More specifically, such testing is done, for example, in a basic fibre channel fabric configuration including at least one host, a fibre channel or multiple fibre channel switches and a plurality of storage arrays connected through the switches to at least one host.

In previous pseudo-random testing sequences it has been necessary to start a test over at the beginning of the test in order to reproduce a given sequence for debugging purposes. It has also been necessary to cause the sequence to be exactly repeated through the use of a random seed generated during the original test. As may be appreciated, this results in excessive duplication of activity and is not efficient from a time use perspective since it can take a long time to return to the portion of the sequence that a developer is interested in.

In accordance with the system and method described herein, the problem resulting from conducting testing sequences which require that the sequence be started over from the beginning every time a test fails are avoided.

SUMMARY OF THE INVENTION

In accordance with one aspect, there is described a method of pseudo-random testing a fault tolerant network to determine the network's response to a failure. The method includes the step of generating an image of the network on a host, with the image including the network's components and interconnections. At least one part of the network is selected to physically fail through the use of a pseudo random number generator whereby the selection is done pseudo-randomly. The portion of the network selected is failed, and the network's response to the failure is detected. All attempts to repair the failure are logged, including the first successful attempt to repair the failure.

In a further aspect, the steps of selecting and failing are repeated for each possible network failure, and for each failure the attempts to repair the failure, up to and including the first successful attempt, are logged.

In another aspect, there is disclosed a system for pseudo-random testing a fault tolerant network to determine the network's response. The system includes at least one host having a plurality of storage units having disk arrays therein, which are connected to the host through adapters and switches. The connections between each storage array and the host are made up of more than one path between the host and each storage array, respectively. An image of the network is established in memory on the host, and the host is programmed for pseudo-randomly selecting failures of at least one path to at least one storage unit on the network, and for restoring an active path to the at least one storage unit on the network, and logging each attempt to establish an active path, including the attempt that first successfully establishes the active path.

Yet more specifically, the host is programmed for attempting to restore each path failure, and for logging all attempts to restore each path failure, up to and including the first successful attempt to restore the path, for each path failure of a plurality of path failures.

Yet still further, in the case of multiple failures, once the first repair of path is established, it is possible with both the method and system to reseed the test at a point just before the attempt to repair the prior failed path failed the attempt to repair. In this manner, the pseudo-random sequence need not be restarted at the beginning as when the test first commenced.

BRIEF DESCRIPTION OF THE DRAWINGS

Having thus briefly described the invention, the same will become better understood from the following detailed discussion made with reference to the drawings in which.

DETAILED DESCRIPTION

Figure 1:
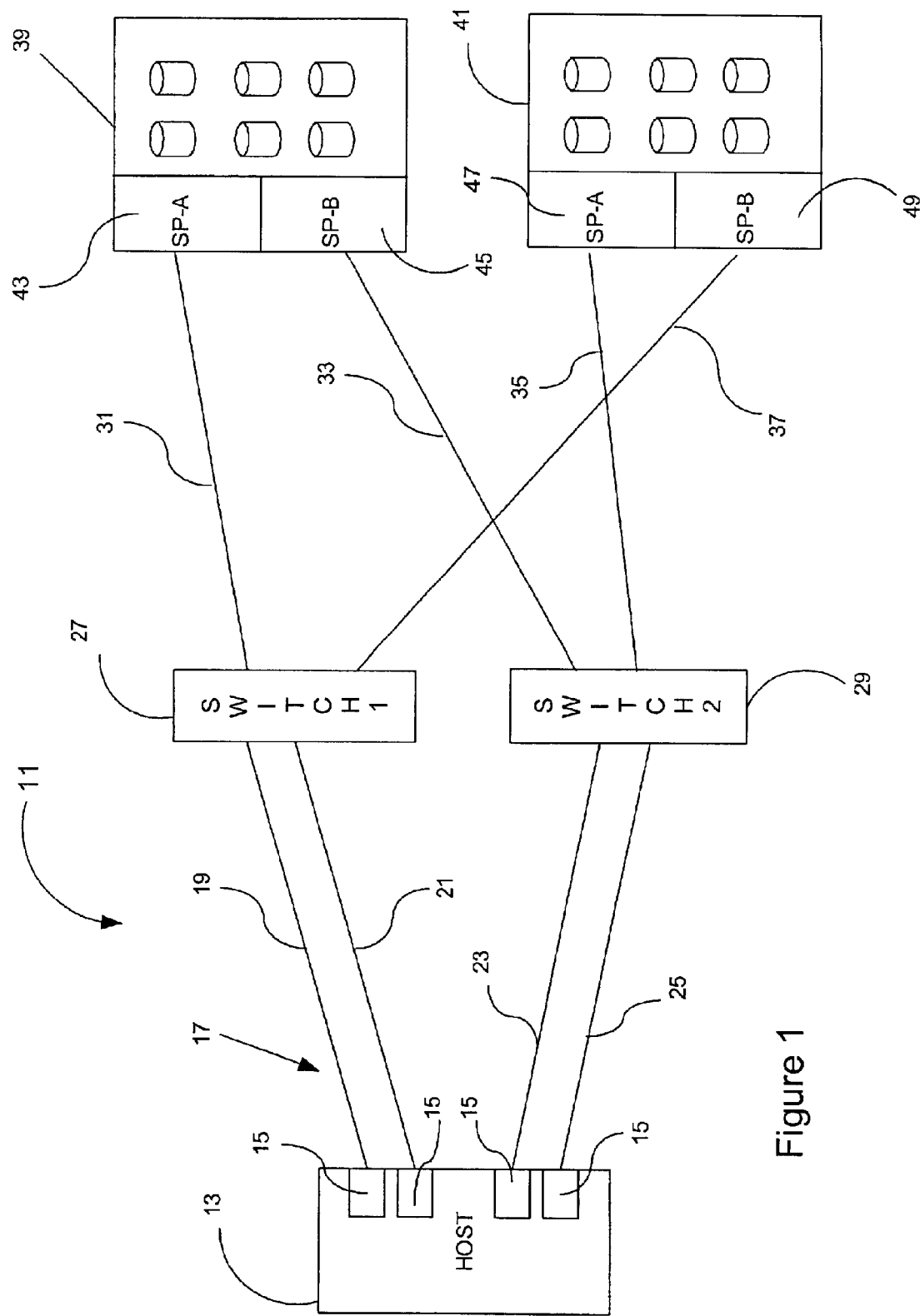
FIG. 1 is a block diagram illustrating a typical network configuration, in simplified form, showing various possible paths between a host and storage arrays on the network.

FIG. 1 illustrates a typical network configuration on which the testing method and system in accordance with the description herein is implemented. The network 11 includes a host 13 which can be a server such as from Sun Microsystems, or other type of conventional server running an operating system such as Solaris, DGUX, etc. The server 13 includes a plurality of adapters 15 which are connected through a fibre channel 17 including paths 19, 21, 23 and 25 through switches 27 and 29 to a plurality of storage units housing disk arrays. In this case, for the sake of simplicity the system is illustrated as having only two storage units 39 and 41. The switches establish fibre channel paths 31, 33, 35 and 37 to the storage units 39 and 41 which are controlled respectively by storage processors SP-A and SP-B identified by the numbers 43, 45, 47 and 49. The storage units 39 and 41 include a number of non-volatile memory drives, illustrated in the figure by the cylinders and the operation thereof is controlled by the storage processors SP-A and SP-B, respectively for each storage unit 39 and 41 in a manner well known to those of ordinary skill in the art.

Under current implementation, the testing software resides on the host 13. In accordance with the method and system, the test and the testing software takes as input a description of what the network looks like and stores it on the host server 13. The information about the network configuration can come from many sources, such as direct input from a user or other sources, as will be readily apparent to those of ordinary skill in the art.

Figure 2:
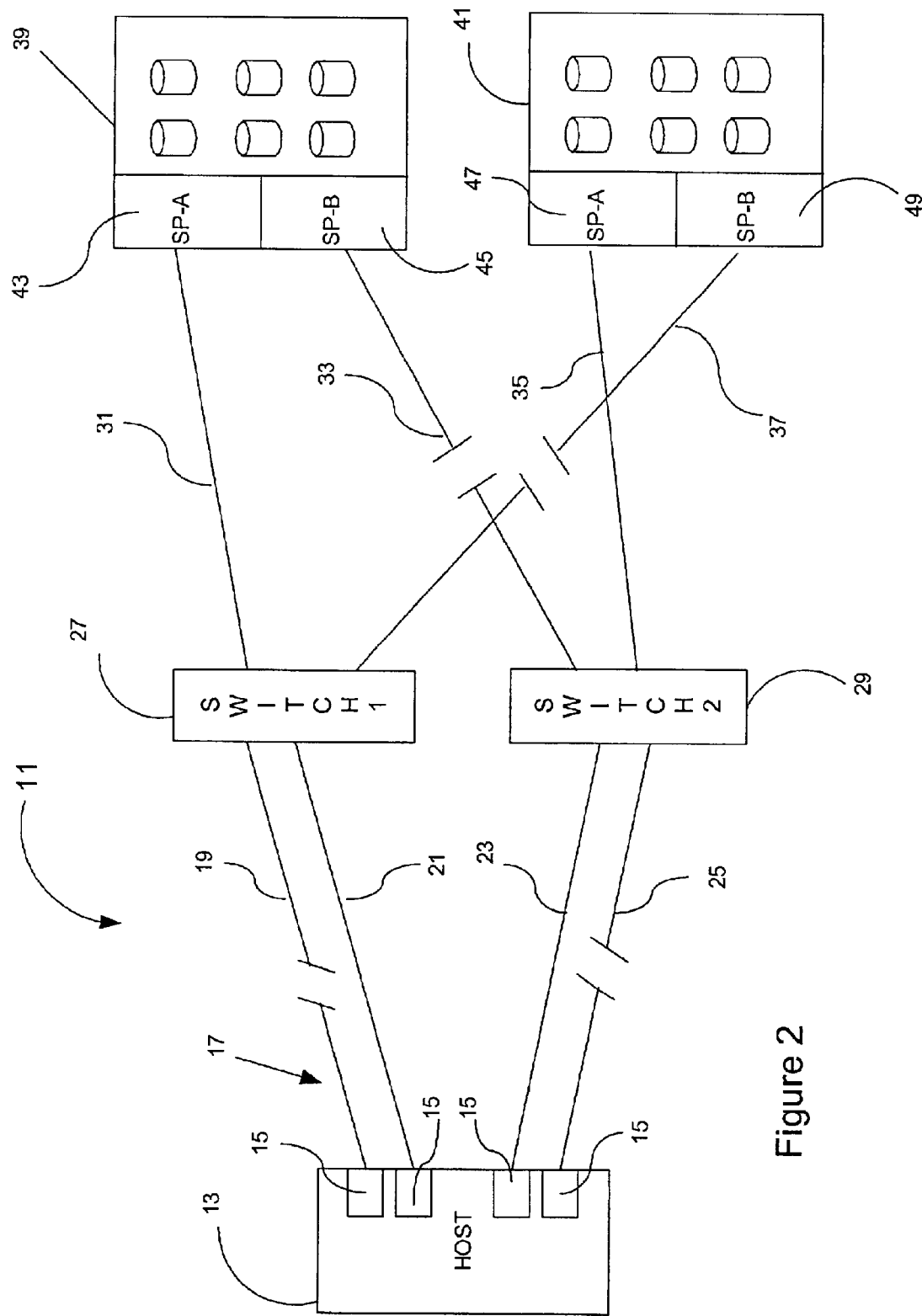
FIG. 2 is a view as in FIG. 1 showing various breaks in active paths between the host and storage arrays on the network, as created in implementing the testing sequence described herein.

Once the image of the network is in the host server 13, a pseudo-random generator is used for establishing a pseudo-random sequence for failing specific links on the network as illustrated in greater detail in FIG. 2. In FIG. 2, the links which are failed are shown as links 19, 25, 33 and 37. As will be evident from a view of FIG. 2, an active path must always be maintained for a particular failure which can be repaired. In this case, the test involves failing paths between the host 13 and storage units 39 and 41. In implementing the test, the host actually physically turns links and various components off, and shuts of transmissions to and from specific ports and adapters.

The host 13 stores the specific failures which were caused so that when the test is completed, the failed parts of the network can be activated. The purpose for conducting the test is to determine the system's fault tolerant capabilities.

Thus, in accordance with the test, a record is now established of the responses by the system in repairing a particular failure. The log of the repair that first worked then allows the repair to occur on a much more expedited basis by going directly to that repair without having other attempts that did not work.

As will be appreciated, the test results and the log is used by developers in maintaining the system. However, in the initial random generated failures, it is clear that every possible case is not tested. Thus, even though multiple paths have failed, there are still paths between the host and the respective storage unit. Thus, if a complete failure occurs at a point where there have been a large number of iterations into the test, i.e., twelve to sixteen, even twenty-four hours into the test, it is not desirable to start at the beginning to get back to the specific sequence that failed to recover paths. Thus, in accordance with the method and system herein, the test can be restarted at each iteration and the random sequence maintained. For example, if at iteration one the random number was four, and at iteration two the number was one hundred, etc., and two is the test that failed to repair, it is not desirable to have to re-run all of the sequences if it previously works. In accordance with the system and method, it is possible to start at the point where the test failed to repair the paths, and the test can continue for further permutations as created by the random number generator.

Information obtained from the test for each failure to repair itself can be transmitted to a developer who can then analyze the result, understand what occurred, and provide a solution to the tester. The tester can then implement the solution and resume the sequence at a point just before the failure. If at that point the test fails and the system does not repair itself, the developer can again be required to provide a repair solution.

Figure 3:
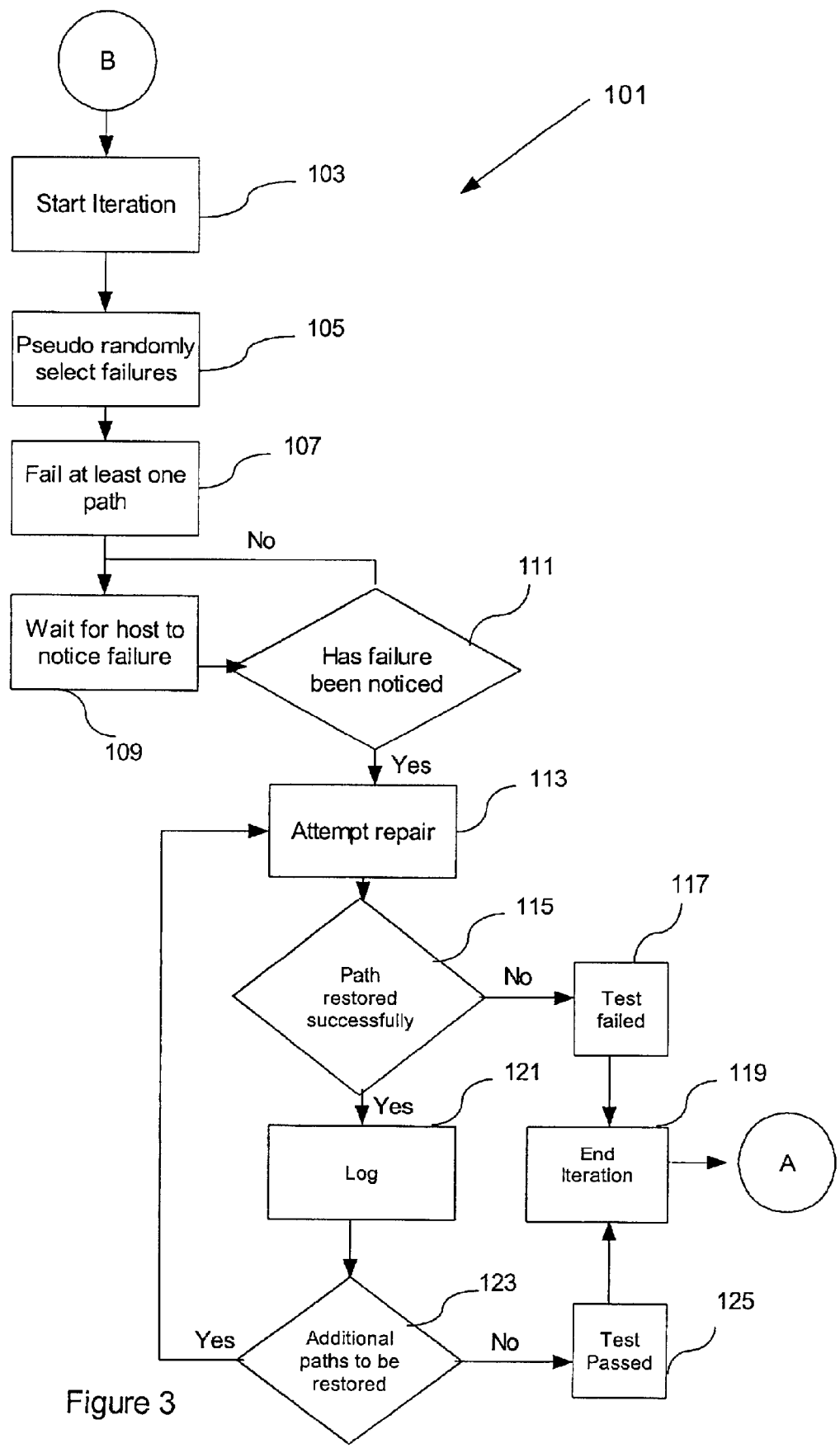
FIG. 3 is a flow diagram illustrating how one iteration of the pseudo-random test in accordance with the method and system described herein proceeds.

FIG. 3 provides in greater detail the general steps employed in implementing the test 101. FIG. 3 shows the test being implemented in only one iteration. As will be appreciated, the method and system described herein encompasses and contemplates the test being implemented in multiple iterations, as will be appreciated by those of ordinary skill in the art from a reading of FIG. 3 as described herein. The test 101 starts at step 103 and at step 105, at least one path failure is pseudo randomly selected. Of course, although it can be one path failure, it can also be multiple path failures which are pseudo randomly selected. The at least one path selected at step 105 is failed at step 107. At step 109, the process waits for the host to notice the failure. At step 111, an inquiry is made about whether the failure has been noticed. If the answer is no, the process returns to step 109 and then 111, until the failure is noticed. If the answer is yes, then an attempt to repair the at least one path failure is made at step 113. At step 115, a query is made as to whether the path was restored. If the answer is no, then at step 117 it is determined that the test failed and the test ends at step 119. At this point the failure to repair is communicated to a developer who attempts to implement a repair solution. Thereafter, the process proceeds to another process as described with respect to FIG. 4 at circle A described hereafter.

If the answer to the question at step 115 is that the path was restored, then all attempts to restore are logged, including the first successful attempt at step 121 and a record is kept. Thereafter at step 123 it is determined if additional paths are to be restored. If the answer is no, then at step 125 an indication that the test passed is created and the test proceeds to the end at step 119. If the answer is yes, the attempt to restore additional paths is resumed at step 113.

To further illustrate how the test is implemented, the following text representation of code will present additional details as will be appreciated by those of ordinary skill in the art. The representations are set forth as steps 1 through 7.

These are the steps that are relevant to the random numbers being used but the test actually commences just before step 5 in the code set forth below.

1. Begin
   goto 2
2. Continue Sequence?
   if yes goto 3
   else goto 4
3. Get random seed from the user
   goto 5
4. Get random seed from clock
   goto 5
5. Set seed in random number generator
6. Print seed to user so that we can continue here if necessary
7. Get next seed
   goto 5.

Figure 4:
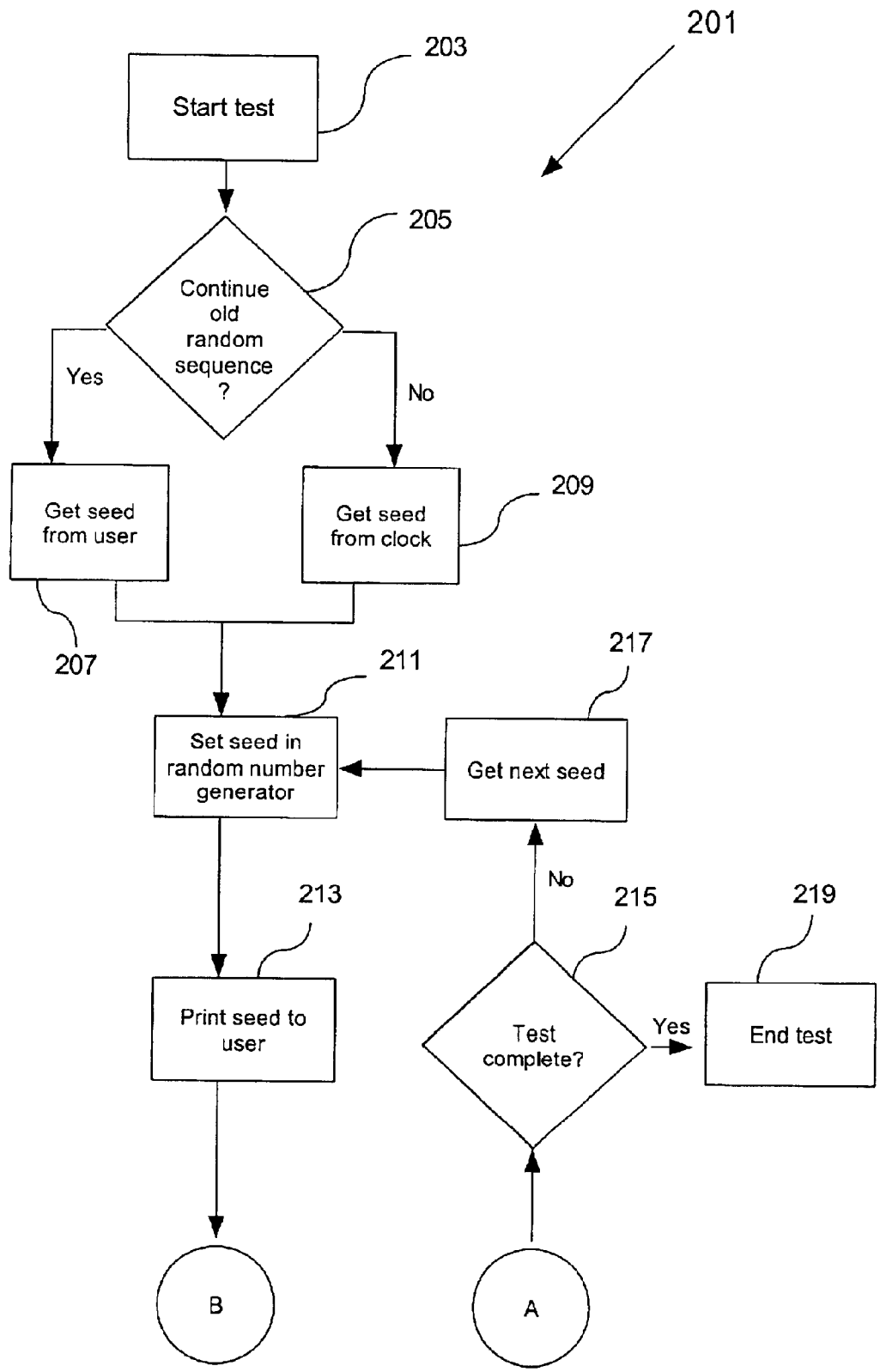
FIG. 4 is a flow diagram illustrating how random number generation is controlled for a full test from the start. It also illustrates how, in the event of a failed test, once the repair is effected, the test can be restarted at a point just before the failure.

The above steps are further illustrated graphically in FIG. 4 which shows in greater detail the use of the random number seed as implemented in FIG. 3 and in the code set forth previously. The selection of the seed is illustrated by block diagram 201 of FIG. 4.

FIG. 4 shows the initial start of the full test. In addition, FIG. 4 shows in greater detail how the restart of a test can occur after failure of a test without having to start the pseudo random sequence all over again. More specifically, FIG. 4 illustrates how the test can be started at a point just prior to the failure so that the repair can be tested, and if the repair works, continue the test without having to start from the beginning, which can take a lot of time depending how far into the test the sequence had extended.

More specifically, at step 203 the test can be started, which is prior to starting the iteration at step 103 of previously discussed FIG. 3. An inquiry is made at step 205 as to whether to continue an old random sequence. If the answer is yes, the seed can be obtained from the user at step 207. If the answer is no, the seed can be obtained from the clock at step 209. At step 211 the seed is set in the random number generator, and at step 213 the seed is printed to the user and the test proceeds to circle B in FIGS. 3 and 4 in which the iteration is started for the test at step 103.

As was previously discussed, once the test ends, either because the test failed at step 117 of FIG. 3, or because the test passed at step 125 of FIG. 3, from the end of the test at step 119 the process of FIG. 3 proceeds to circle A in FIGS. 3 and 4. At step 215 an inquiry is made about whether the test is complete. If the answer is yes, then at step 219 the test is ended. If the answer is no, then the next seed is obtained at step 217, which is at a point just before the test failed, so that the sequence need not be duplicated from the beginning. The seed is then set in the random number generator at step 211 and printed to the user at step 213 so that the test can continue at that point if necessary.

Having thus generally described the invention, the same will become better understood from the following claims in which it is set forth in a non-limiting manner.

What is claimed is:

1. A method of pseudo-random testing a fault tolerant network to determine the network's response to a failure, comprising:
   (a) storing an image of a network on a host, including the network's components and interconnections;
   (b) selecting at least one part of the network to physically fail using a pseudo-random number generator whereby said selection is done pseudo-randomly;
   (c) failing the at least one selected part of the network, detecting the network's response to the failure, and logging all attempts to repair the failure, up to and including the first successful attempt to repair the failure;
   (d) repeating steps (b) and (c) for each possible network failure, and said step (c) further comprising logging all attempts to repair each failure, up to and including the first successful attempt to repair the failure for each failure; and
   (e) for a failed test, restarting the test at the point the test failed, whereby the test need not be restarted at the beginning of the number sequence once a repair is made.

2. The method of claim 1, wherein said failures are failures of adapters on the network.

3. The method of claim 1, wherein said failures are failures of switches on the network.

4. A method of pseudo-random testing a fault-tolerant network to determine the network's response to a failure, comprising:
   (a) storing an image of a network in a host, including the network's components and interconnections;
   (b) selecting a plurality of parts of the network to physically fail using a pseudo-random number generator with the selection being done pseudo-randomly;
   (c) failing the selected plurality of parts part of the network, detecting the network's response to the failing and logging all attempts to repair the failing, up to and including the first successful attempt to repair the failing;
   (d) repeating steps (b) and (c) for each failed part of the network, and said step (c) further comprising logging all attempts to repair each failure, up to and including the first successful attempt to repair the failure for each failure; and
   (e) for each failed part for which the network recovers, restarting the attempt to repair subsequent failures at the point of said part failed network recovery.

5. The method of claim 4, wherein said failure of a plurality of parts further comprises conducting said failing in a manner that at least one active path is maintained to each one of a plurality of storage arrays making up the network.

6. The method of claim 4, wherein for each failed part for which the network recovers, selecting at least one part of the network to physically fail by using said random number generator to ensure said selection is done pseudo-randomly.

7. The method of claim 4, wherein said failures are failures of adapters on the network.

8. The method of claim 4, wherein said failures are failures of switches on the network.

9. A system for pseudo-random testing a fault tolerant network to determine the network's response to a failure, comprising:
   at least one host, having a plurality of storage arrays connected thereto through adapters and switches;
   the connections between each storage array and the host comprised of more than one path;
   an image of the network stored in memory on said host, and said host programmed for pseudo-randomly selecting failures of at least one path to at least one array on the network, and for restoring an active path to said at least one array on the network and for logging each attempt to establish an active path to the at least one array on the at least one failed path, including the attempt that first successfully establishes an active path; and
   said host being programmed for attempting to restore each path failure, and for logging all attempts to restore each path failure, up to and including the first successful attempt to restore the path for each path failure, and in the event a failure to repair a path occurs, once the path is repaired, for restarting the test at the point the failure to repair a path occurred.

10. The system of claim 9, wherein said host is programmed for failing adapters to cause failures of said paths.

11. The system of claim 9, wherein said host is programmed for failing switches to cause failures of said paths.

12. The system of claim 9, wherein said host is programmed for failing a plurality of paths on the network and for restoring an active path for each path failed and logging all attempts to restore each path, including the first successful attempt.

13. The system of claim 12, wherein the host is programmed for restarting the attempt to restore failed paths at the point at which a prior failed path was recovered.

14. The system of claim 12, wherein said host is programmed to maintain at least one active path said at least one array on the network when said path failing is conducted.

15. The system of claim 12, wherein the host is programmed such that when a failed path is recovered, failures of failed paths are restarted in a pseudo-random manner.

16. The system of claim 12, wherein said host is programmed for failing adapters to cause failures of said paths.

17. The system of claim 12, wherein said host is programmed for failing switches to cause failures of said paths.

* * * * *